June 17, 1930.　　　M. HECKMAN　　　1,764,626
PNEUMATIC GROOMING DEVICE FOR ANIMALS
Filed May 21, 1928　　　2 Sheets-Sheet 1
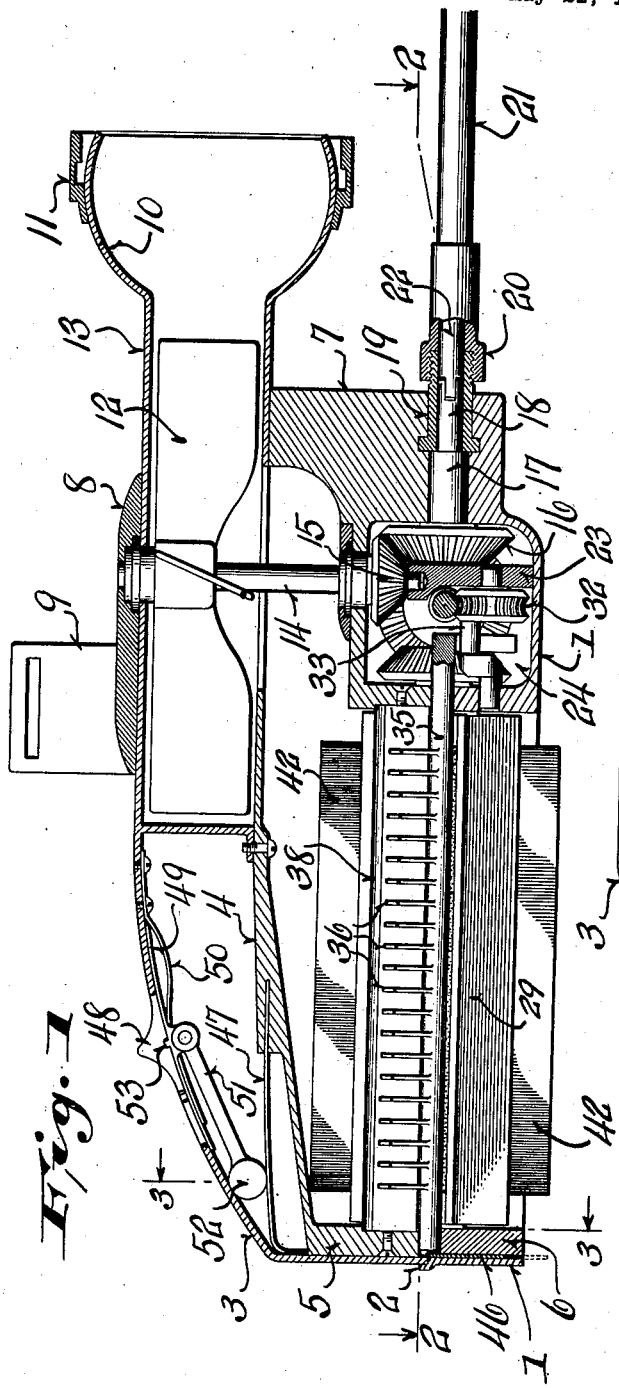
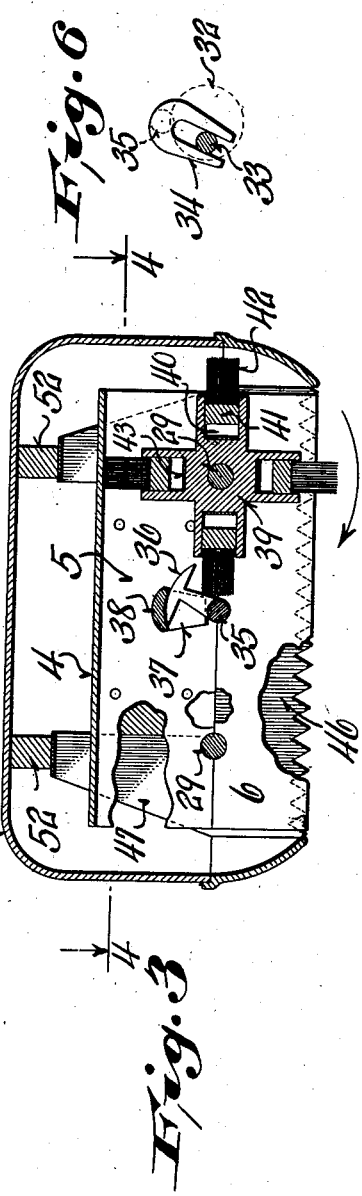
Inventor:
Martin Heckman June 17, 1930. M. HECKMAN 1,764,626
PNEUMATIC GROOMING DEVICE FOR ANIMALS
Filed May 21, 1928 2 Sheets-Sheet 2
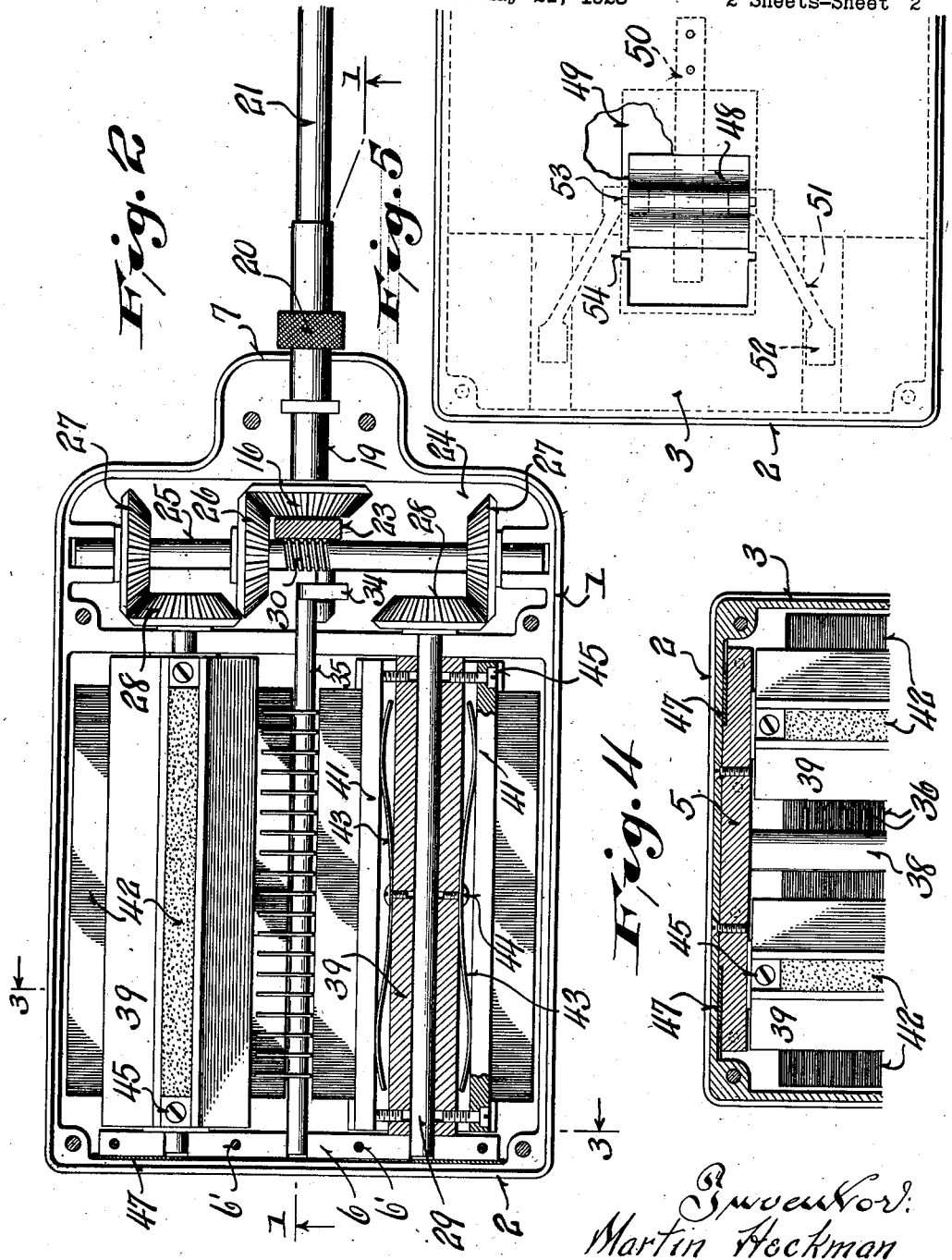
Inventor:
Martin Heckman Patented June 17, 1930

1,764,626

UNITED STATES PATENT OFFICE

MARTIN HECKMAN, OF MERRILL, WISCONSIN

PNEUMATIC GROOMING DEVICE FOR ANIMALS

Application filed May 21, 1928. Serial No. 279,313.

This invention relates to pneumatic grooming devices for animals.

Objects of this invention are to provide a novel form of grooming device which is power driven and provided with rotary brushes and a suction fan so that it may be freely passed over the animal and remove the loose hair and dirt therefrom and withdraw this removed material and discharge it into a suitable discharge pipe.

Further objects are to provide a device having a pair of revolving brushes and an automatic cleaner for the brushes, so constructed that it will oscillate first into engagement with one brush and then into engagement with the other brush, and which passes through a device for cleaning the brush cleaner itself, so that no hair, grit, or other material can be retained by the cleaner with consequent clogging of the machine.

Further objects are to provide a power driven device having rotary brushes and a suction fan in conjunction with a disappearing currycomb so that if it becomes necessary to use the currycomb, it may be instantly projected from the device while the device is in active operation.

An embodiment of the invention is shown in the accompanying drawings in which:

Figure 1 is a longitudinal sectional view through the device, such view corresponding to a section on the line 1—1 of Figure 2;

Figure 2 is a sectional view on the line 2—2 of Figure 1, showing the device as it appears with the upper portion removed.

Figure 3 is a sectional view on the line 3—3 of Figures 1 and 2;

Figure 4 is a fragmentary sectional view on the line 4—4 of Figure 3;

Figure 5 is a fragmentary top plan view with parts broken away;

Figure 6 is a detail view of the rock arm and crank.

Referring to the drawings, it will be seen that the device comprises an open bottom casing consisting of a bottom member 1 which is provided with an outwardly projecting flange 2 which surrounds a recess adapted to receive the lower portion of the upper casing 3. This upper casing 3 has a member 4 secured thereto in any suitable manner and provided with a thickened rear portion or end portion 5 constituting a half bearing. The other half of the bearing is indicated by the reference character 6 and is secured to the portion 5 in any suitable manner, as by means of the bolts 6' (see Figure 2). The bottom member 1 forms a bearing for the front end of the brush shafts and the rock shaft hereinafter described, and is completed by means of the block or member 7 (see Figure 1) which constitutes the upper half of the bearings.

The upper portion of the device is provided with a small cover plate 8 and with a pair of upwardly projecting strap receiving tongues 9 so that the device may be provided with a strap beneath which the hand of the operator may be readily slipped, the member 8 providing a secure grip or bearing portion for the palm of the hand. Obviously, other types of handles or manipulating members could be employed in place of the one shown, although the form shown is highly serviceable.

The rear end of the upper portion of the casing projects outwardly and provides a ball joint 10 which is equipped with any form of locking ring 11 adapted to hold a cooperating ball joint in contact with the portion 10, thus constituting a continuous discharge pipe for the removed material.

Within the upper portion of the casing, a fan 12 is positioned and discharges through the outlet portion 13 communicating with the ball 10. This fan is carried by a vertical shaft 14 whose lower end is provided with a bevel gear 15 meshing with a bevel gear 16 carried by the driven shaft 17. This driven shaft is provided with a reduced portion 18 carried by a fitting 19. The fitting 19 is flanged and locked in place within the block or member 7, as shown in Figure 1. It is provided with a threaded outer end adapted to receive the union 20 of the flexible casing 21. The shaft 18 is slotted and receives the tongue of the flexible shaft 22. The lower end of the fan shaft is carried by an upwardly projecting member 23 (see Figures 1 and 2) carried by the member 1.

The members 1 and 7 form between them a rectangular compartment 24 which may be considered a gear case for the reception of the several gears of the device, as will appear as the description proceeds. Within the gear case or compartment 24, a transverse shaft 25 is positioned and carried by end bearings. It is provided with a bevel gear 26 which meshes with the gear 16 and thus permits the ready driving of the shaft 25. The shaft 25 carries a pair of bevel gears 27 adjacent its ends which mesh with the bevel gears 28 of the brush shafts 29.

Further, it is to be noted that the transverse shaft 25 is provided with a worm 30 intermediate its ends which meshes with a worm wheel 32 (see Figure 1). This worm wheel is provided with a crank or eccentric portion 33 which fits within the slot of the rock arm 34 of a rock shaft 35. The rock shaft is carried between the brushes and is provided with a plurality of double prongs 36 which may be considered a comb, and which are employed for cleaning the brushes in a manner hereinafter to appear. The cleaning comb or prongs 36 rock through slots 37 formed in a stripper bar or cleaning bar 38 so that the comb is self-cleaning, as it is rocked back and forth during the operation of the device.

The brush shafts 29 carry the brush hubs 39, as shown most clearly in Figure 3. These brush hubs are provided with slotted portions 40 within which the bases or bristles carrying portions 41 of the brushes are slidably positioned. The bristles 42 are vulcanized in place, or otherwise secured, to the bristle carrying or base portions 41, and these portions 41 are, as stated, slidably carried within the slots 40 of the brush hub. They are urged outwardly by means of the doubly bowed leaf springs 43. The central portions of these leaf springs are retained by means of the screws 44 and their outer portions bear against the bristle carrying members 41. These bristle carrying members are apertured adjacent their ends and slidably receive the headed adjusting screws 45 which are threaded into the hub portions 39 of the brushes.

These adjusting screws, when the brushes are new, are drawn up fairly close, and as the brushes wear, they are backed out to keep the brushes of the same effective size. Obviously, when the brushes are completely worn out, they may be most readily replaced by removing the screws 49 and reinserting them through new brushes.

From the apparatus thus far described, it is apparent that when the brushes are driven, they will rotate in reverse directions in the manner shown by the arrow in Figure 3, and that the brush cleaner or comb will oscillate first into engagement with one brush and thereafter into engagement with the other brush, thus alternately cleaning the brushes. This comb or brush cleaner is itself stripped clean of any adhering material by means of the cleaner bar or cleaner member 38, previously described. The material from the brushes and from the cleaner comb is sucked up by the fan 12 and blown through the discharge portion. The device may be used with a collecting bag held by the ring 11 or it may be used with a discharge pipe.

A disappearing currycomb 46 is provided and is normally housed within the device. It is adapted to be projected outwardly when desired. This currycomb 46 consists of a plate-like member having upwardly extending end arms 47. The portion 46 of the currycomb is located between the member 6 and the outer end of the bottom casing 1, as shown in Figures 1 and 3. The portions 47 project upwardly and are received within slots formed in the member 5, as shown most clearly in Figure 3. The arms 47 are bent forwardly and are received in slots in the portion 4, as shown in Figure 1.

The means for projecting the currycomb consists of a slidable thumb-piece 48 (see Figures 1 and 5) which project slightly beyond the upper curved forward surface of the upper casing 3. This clip or thumbpiece is secured to a bottom plate 49 which closes the hole within which the clip slides. The clip is held in place by means of the spring 50. It is to be noted that the clip is provided with downwardly projecting enlarged portions to which the links 51 (see Figures 1 and 5) are pivoted. These links are provided with enlarged free ends 52 which wedge between the casing 3 and the arms 47 when they are pushed to the left, as viewed in Figure 1. When pushed to the left, they bear downwardly upon the arms 47 and thus force the currycomb outwardly. When they are retracted, the currycomb springs inwardly due to the natural resiliency of its arms 47. Any material carried by the currycomb is stripped off and is sucked upwardly by the draft created by the fan.

The clip 48 is provided with projecting tongues 53 (see Figures 1 and 5) which fit within either one of a pair of notches 54. In moving the clip, all that is necessary is to press it inwardly against the action of the spring 50 to dislodge the projections 53 and thereafter to slide the clip in the direction intended, allowing it to move upwardly a slight distance to position the projections 53 in the other pair of slots 54.

Thus, it is apparent that the projection or retraction of the currycomb can be easily controlled by the hand of the operator without removing his hand from the device, and also that the control of the currycomb may be had while the device is in active operation.

It will be seen that a simple type of pneumatic self-cleaning grooming device has been provided by this invention, which may be made very compact and of relatively light weight, and which will thoroughly brush and groom the animal and remove the dislodged material.

Although the invention has been described in considerable detail, such description is intended as illustrative rather than limiting as the invention may be variously embodied and as the scope of such invention is to be determined as claimed.

I claim:

1. A grooming device comprising a casing, a pair of reversely rotating brushes, power driven means for driving said brushes, a rocking cleaner adapted to alternately engage said brushes, and a slotted bar through which said cleaner oscillates, whereby said slotted bar will remove material caught by said cleaner.

2. A power driven grooming device comprising a casing having a lower section provided with an open bottom, a pair of reversely rotating brushes mounted within said casing and projecting through said open bottom, an oscillating shaft mounted between said brushes and having projecting prongs adapted to move alternately into engagement with said brushes, means for rotating said brushes and oscillating said shaft, and a fan connected with said last mentioned means and mounted within said casing.

3. In a device of the class described, the combination of a casing, a pair of revoluble brushes mounted within said casing and having their axes parallel, said brushes having portions projecting through said casing, an oscillating shaft mounted between said brushes and provided with a plurality of prongs adapted to alternately engage said brushes, a longitudinally extending slotted bar through which said prongs oscillate, a transverse shaft, power driven means for driving said transverse shaft, means operatively connecting said brushes and said transverse shaft for imparting rotation to said brushes, said transverse shaft having a worm thereon, a worm wheel meshing with said worm and provided with a crank, and a slotted lever carried by said oscillating shaft and engaging said crank.

4. In a device of the class described, the combination of a casing, a pair of revoluble brushes mounted within said casing and having their axes parallel, said brushes having portions projecting through said casing, an oscillating shaft mounted between said brushes and provided with a plurality of prongs adapted to alternately engage said brushes, a longitudinally extending slotted bar through which said prongs oscillate, a transverse shaft, power driven means for driving said transverse shaft, means operatively connecting said brushes and said transverse shaft for imparting rotation to said brushes, said transverse shaft having a worm thereon, a worm wheel meshing with said worm and provided with a crank, a slotted lever carried by said oscillating shaft and engaging said crank, and a fan operatively coupled with said power driven means and mounted within said casing, said fan having an intake in proximity to said brushes and having an outwardly projecting outlet portion.

In testimony that I claim the foregoing I have hereunto set my hand at Merrill, in the county of Lincoln, and State of Wisconsin.

MARTIN HECKMAN.